United States Patent
Sammut

(10) Patent No.: US 6,681,512 B2
(45) Date of Patent: *Jan. 27, 2004

(54) GUNSIGHT AND RETICLE THEREFOR

(75) Inventor: Dennis J. Sammut, Woodside, CA (US)

(73) Assignee: Horus Vision, LLC, San Bruno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/092,921

(22) Filed: Mar. 6, 2002

(65) Prior Publication Data

US 2002/0124452 A1 Sep. 12, 2002

Related U.S. Application Data

(63) Continuation-in-part of application No. 09/519,124, filed on Mar. 6, 2000, now Pat. No. 6,453,595, which is a continuation-in-part of application No. 09/129,729, filed on Aug. 5, 1998, now Pat. No. 6,032,374, which is a continuation-in-part of application No. 08/986,458, filed on Dec. 8, 1997, now Pat. No. 5,920,995.

(51) Int. Cl.[7] .................................................. F41G 1/38
(52) U.S. Cl. ............................ 42/122; 42/130; 33/265
(58) Field of Search .......................... 42/122, 119, 130, 42/133, 144; 33/265, 297

(56) References Cited

U.S. PATENT DOCUMENTS

| | | | | |
|---|---|---|---|---|
| 912,050 A | * | 2/1909 | Wanee | 42/144 |
| 1,190,121 A | | 7/1916 | Critchett | |
| 1,425,321 A | * | 8/1922 | Etherington | 42/133 |
| 1,428,389 A | * | 9/1922 | Miller | 42/133 |
| 1,540,772 A | * | 6/1925 | Gibbs | 42/133 |
| 1,851,189 A | * | 3/1932 | King | 42/144 |
| 2,420,273 A | * | 5/1947 | West | 359/498 |
| 2,486,940 A | * | 11/1949 | Garber et al. | 42/144 |
| 2,615,252 A | * | 10/1952 | Wing | 42/144 |
| 2,806,287 A | | 9/1957 | Sullivan | 33/50 |
| 3,190,003 A | | 6/1965 | O'Brien | 33/50 |
| 3,392,450 A | | 7/1968 | Herter et al. | 33/50 |
| 3,410,644 A | * | 11/1968 | Mclendon | 359/425 |
| 3,431,652 A | | 3/1969 | Leatherwood | 33/50 |
| 3,492,733 A | | 2/1970 | Leatherwood | 33/50 |
| 3,682,552 A | | 8/1972 | Hartman | 356/3 |
| 3,744,133 A | | 7/1973 | Fukushima et al. | 33/234 |
| 3,744,143 A | * | 7/1973 | Kilpatrick | 42/144 |
| 3,782,822 A | | 1/1974 | Spence | 356/21 |
| 3,798,796 A | | 3/1974 | Stauff et al. | 35/25 |
| 3,876,304 A | | 4/1975 | Novak | 356/71 |
| 3,902,251 A | | 9/1975 | Ross | 33/246 |
| 3,948,587 A | | 4/1976 | Rubbert | 356/21 |

(List continued on next page.)

FOREIGN PATENT DOCUMENTS

DE 20008101 U1 * 5/2000

OTHER PUBLICATIONS

"TDS Tri–Factor: A Clear Shot; A Clear Kill" bu T.D. Smith Copyright 1992.

Deutsch Optik Catalog, Summer 1997, one page discussing relative merits of optical v. laser rangefinders.

Primary Examiner—Michael J. Carone
Assistant Examiner—Denise J Buckley
(74) Attorney, Agent, or Firm—Medlen & Carroll, LLP

(57) ABSTRACT

An improved optical device for use in aiming guns is provided by combining a conventional telescopic gunsight with a reticle having an optical center, an edge and one or more aiming points, and a ring which is positioned optically between the optical center and the edge whereby said ring can be visually centered in a field of view for aiding users in aligning their line of sight through the optical device. The optical device can be any conventional optical device used by shooters as an aid to aiming such as, for example, gunsights, riflescopes, spotting scopes, binoculars and the like.

10 Claims, 11 Drawing Sheets

U.S. PATENT DOCUMENTS

| | | | |
|---|---|---|---|
| 4,014,482 A | 3/1977 | Esker et al. | 244/3.13 |
| 4,102,053 A * | 7/1978 | Colwell | 42/136 |
| 4,247,161 A | 1/1981 | Unertl, Jr. | 350/10 |
| 4,248,496 A | 2/1981 | Akin, Jr. et al. | 350/10 |
| 4,255,013 A | 3/1981 | Allen | 350/10 |
| 4,263,719 A | 4/1981 | Murdoch | 33/297 |
| 4,285,137 A | 8/1981 | Jennie | 33/246 |
| 4,395,096 A | 7/1983 | Gibson | 350/560 |
| 4,403,421 A | 9/1983 | Shepherd | 33/246 |
| 4,408,842 A | 10/1983 | Gibson | 350/560 |
| 4,458,436 A * | 7/1984 | Bohl | 42/133 |
| 4,497,548 A | 2/1985 | Burris | 350/560 |
| 4,584,776 A | 4/1986 | Sheperd | 33/246 |
| 4,616,421 A * | 10/1986 | Forsen | 42/130 |
| 4,627,171 A | 12/1986 | Dudney | 33/241 |
| 4,777,352 A | 10/1988 | Moore | 235/404 |
| 4,787,739 A * | 11/1988 | Gregory | 356/21 |
| 4,833,786 A * | 5/1989 | Shores, Sr. | 33/265 |
| 4,912,853 A | 4/1990 | McDonnell et al. | 33/228 |
| 4,965,439 A | 10/1990 | Moore | 235/404 |
| 5,157,839 A * | 10/1992 | Beutler | 33/265 |
| 5,181,323 A * | 1/1993 | Cooper | 359/422 |
| 5,375,072 A | 12/1994 | Cohen | 364/561 |
| 5,454,168 A | 10/1995 | Langner | 33/234 |
| 5,491,546 A | 2/1996 | Wascher et al. | 356/4.03 |
| 5,887,352 A * | 3/1999 | Kim | 42/144 |
| 5,920,995 A * | 7/1999 | Sammut | 42/122 |
| 6,025,908 A | 2/2000 | Houde-Walter | 356/153 |
| 6,032,374 A * | 3/2000 | Sammut | 42/122 |
| 6,058,921 A * | 5/2000 | Lawrence et al. | 124/87 |

* cited by examiner

Sights on at 500 yards. Sights are 3.00 inches above bore.
Angle of Departure = 0.21 deg. (Firing angle = 0 deg.)

| Range (yds) | 50 | 100 | 150 | 200 | 250 | 300 | 350 | 400 | 450 | 500 |
|---|---|---|---|---|---|---|---|---|---|---|
| Traj. (in.) | 3.3 | 8.3 | 12.2 | 14.8 | 16.1 | 16.0 | 14.4 | 11.2 | 6.5 | 0.0 |
| Traj. (MOA) | 6.2 | 8.0 | 7.8 | 7.1 | 6.2 | 5.1 | 3.9 | 2.7 | 1.4 | 0.0 |

| Range (yds) | 550 | 600 | 650 | 700 | 750 | 800 | 850 | 900 | 950 | 1000 |
|---|---|---|---|---|---|---|---|---|---|---|
| Traj. (in.) | -8.2 | -18.4 | -30.5 | -44.6 | -61.0 | -79.7 | -101 | -124 | -151 | -180 |
| Traj. (MOA) | -1.4 | -2.9 | -4.5 | -6.1 | -7.8 | -9.5 | -11.3 | -13.2 | -15.1 | -17.2 |

| Range (yds) | 1050 | 1100 | 1150 | 1200 | 1250 | 1300 | 1350 | 1400 | 1450 | 1500 |
|---|---|---|---|---|---|---|---|---|---|---|
| Traj. (in.) | -212 | -247 | -286 | -328 | -374 | -424 | -477 | -535 | -598 | -665 |
| Traj. (MOA) | -19.3 | -21.5 | -23.7 | -26.1 | -28.6 | -31.1 | -33.8 | -36.5 | -39.4 | -42.4 |

| Range (yds) | 1550 | 1600 | 1650 | 1700 | 1750 | 1800 | 1850 | 1900 | 1950 | 2000 |
|---|---|---|---|---|---|---|---|---|---|---|
| Traj. (in.) | -738 | -816 | -899 | -989 | -1085 | -1187 | -1295 | -1411 | -1533 | -1662 |
| Traj. (MOA) | -45.5 | -48.7 | -52.1 | -55.6 | -59.2 | -63.0 | -66.9 | -70.9 | -75.1 | -79.4 |

| Range (yds) | 2050 | 2100 | 2150 | 2200 | 2250 | 2300 | 2350 | 2400 | 2450 | 2500 |
|---|---|---|---|---|---|---|---|---|---|---|
| Traj. (in.) | -1799 | -1942 | -2093 | -2252 | -2418 | -2592 | -2774 | -2965 | -3163 | -3370 |
| Traj. (MOA) | -83.8 | -88.3 | -93.0 | -97.8 | -102.6 | -107.6 | -112.8 | -118.0 | -123.3 | -128.7 |

Hunting Shock 750 Gr AMAX Match .50 BMG
(Calculated using Ingalls' table)

| Bullet Weight | 750 grains | Bullet Caliber | 0.500 |
|---|---|---|---|
| Sectional Density | 0.429 | Coefficient of Form | 0.571 |
| Effective Bal. Coeff | 0.750 | Bal. Coeff at STP | 0.750 |
| Cross wind | 10.0 m.p.h. | Altitude | 0 Ft. |
| Atmospheric pressure | 30.00 in. | Temperature | 60.0 F |

| Range yards | Velocity f.p.s. | Energy ft-lb | Momentum lb.-sec. | Mx. Ord. in. | Defl. in. | Drop in. | Lead in/mph | Time sec. |
|---|---|---|---|---|---|---|---|---|
| 0 | 2800 | 13054.6 | 9.3247 | 0.0 | 0.0 | 0.0 | 0.0 | 0.000 |
| 50 | 2736 | 12468.5 | 9.1130 | 0.1 | 0.1 | 0.6 | 1.0 | 0.054 |
| 100 | 2674 | 11903.1 | 8.9040 | 0.6 | 0.4 | 2.3 | 1.9 | 0.110 |
| 150 | 2612 | 11357.7 | 8.6976 | 1.3 | 1.0 | 5.2 | 2.9 | 0.166 |
| 200 | 2551 | 10833.0 | 8.4943 | 2.4 | 1.8 | 9.4 | 4.0 | 0.225 |
| 250 | 2491 | 10329.2 | 8.2945 | 3.9 | 2.8 | 15.0 | 5.0 | 0.284 |
| 300 | 2432 | 9845.5 | 8.0979 | 5.7 | 4.1 | 21.9 | 6.1 | 0.345 |
| 350 | 2374 | 9381.1 | 7.9046 | 8.0 | 5.7 | 30.4 | 7.2 | 0.407 |
| 400 | 2317 | 8935.5 | 7.7146 | 10.7 | 7.5 | 40.3 | 8.3 | 0.471 |
| 450 | 2260 | 8508.0 | 7.5278 | 13.9 | 9.6 | 51.9 | 9.5 | 0.537 |
| 500 | 2205 | 8098.0 | 7.3442 | 17.6 | 12.0 | 65.2 | 10.6 | 0.604 |
| 550 | 2151 | 7705.0 | 7.1637 | 21.8 | 14.7 | 80.2 | 11.8 | 0.673 |
| 600 | 2098 | 7328.3 | 6.9864 | 26.7 | 17.7 | 97.2 | 13.1 | 0.744 |
| 650 | 2046 | 6967.3 | 6.8122 | 32.1 | 21.1 | 116.1 | 14.4 | 0.816 |
| 700 | 1994 | 6621.6 | 6.6410 | 38.2 | 24.7 | 137.1 | 15.7 | 0.890 |
| 750 | 1944 | 6290.6 | 6.4729 | 45.1 | 28.7 | 160.3 | 17.0 | 0.966 |
| 800 | 1894 | 5973.7 | 6.3078 | 52.7 | 33.0 | 185.7 | 18.4 | 1.045 |
| 850 | 1845 | 5670.5 | 6.1456 | 61.2 | 37.7 | 213.6 | 19.8 | 1.125 |
| 900 | 1798 | 5380.5 | 5.9864 | 70.5 | 42.8 | 244.1 | 21.2 | 1.207 |
| 950 | 1751 | 5104.6 | 5.8309 | 80.7 | 48.2 | 277.2 | 22.7 | 1.292 |
| 1000 | 1705 | 4842.8 | 5.6794 | 92.0 | 54.1 | 313.2 | 24.3 | 1.379 |
| 1050 | 1661 | 4594.5 | 5.5319 | 104.4 | 60.3 | 352.2 | 25.8 | 1.468 |

| FIG. 8A |
|---|
| FIG. 8B |

FIG. 8

| | | | | | | | |
|---|---|---|---|---|---|---|---|
| 1100 | 1618 | 4358.9 | 5.3882 | 117.9 | 67.0 | 394.3 | 27.4 | 1.559 |
| 1150 | 1576 | 4135.4 | 5.2482 | 132.6 | 74.1 | 439.7 | 29.1 | 1.653 |
| 1200 | 1535 | 3923.3 | 5.1119 | 148.6 | 81.7 | 488.7 | 30.8 | 1.750 |
| 1250 | 1495 | 3722.1 | 4.9791 | 166.1 | 89.7 | 541.3 | 32.5 | 1.849 |
| 1300 | 1456 | 3531.3 | 4.8498 | 185.0 | 98.1 | 597.8 | 34.3 | 1.950 |
| 1350 | 1418 | 3350.2 | 4.7238 | 205.4 | 107.1 | 658.3 | 36.2 | 2.055 |
| 1400 | 1382 | 3178.4 | 4.6011 | 227.6 | 116.5 | 723.2 | 38.0 | 2.162 |
| 1450 | 1346 | 3016.8 | 4.4826 | 251.5 | 126.4 | 792.6 | 40.0 | 2.272 |
| 1500 | 1312 | 2867.1 | 4.3700 | 277.4 | 136.9 | 866.9 | 42.0 | 2.385 |
| 1550 | 1280 | 2728.4 | 4.2629 | 305.4 | 147.8 | 946.3 | 44.0 | 2.500 |
| 1600 | 1249 | 2599.4 | 4.1610 | 335.5 | 159.3 | 1031.1 | 46.1 | 2.619 |
| 1650 | 1220 | 2479.7 | 4.0640 | 367.9 | 171.2 | 1121.4 | 48.2 | 2.741 |
| 1700 | 1193 | 2371.7 | 3.9745 | 402.8 | 183.7 | 1217.7 | 50.4 | 2.865 |
| 1750 | 1169 | 2274.7 | 3.8924 | 440.2 | 196.6 | 1320.3 | 52.7 | 2.992 |
| 1800 | 1146 | 2187.0 | 3.8166 | 480.5 | 210.0 | 1429.2 | 54.9 | 3.122 |
| 1850 | 1125 | 2107.4 | 3.7465 | 523.7 | 223.8 | 1544.7 | 57.3 | 3.254 |
| 1900 | 1105 | 2034.6 | 3.6812 | 569.8 | 238.1 | 1666.9 | 59.6 | 3.388 |
| 1950 | 1087 | 1967.8 | 3.6203 | 618.7 | 252.7 | 1795.9 | 62.0 | 3.525 |
| 2000 | 1070 | 1906.2 | 3.5632 | 670.5 | 267.8 | 1931.9 | 64.5 | 3.664 |
| 2050 | 1054 | 1849.2 | 3.5095 | 725.3 | 283.2 | 2075.0 | 67.0 | 3.805 |
| 2100 | 1039 | 1796.3 | 3.4590 | 783.0 | 299.0 | 2225.5 | 69.5 | 3.949 |
| 2150 | 1024 | 1747.1 | 3.4112 | 843.8 | 315.2 | 2383.3 | 72.1 | 4.094 |
| 2200 | 1011 | 1701.0 | 3.3660 | 907.7 | 331.7 | 2548.7 | 74.7 | 4.242 |
| 2250 | 998 | 1657.9 | 3.3231 | 974.8 | 348.6 | 2721.9 | 77.3 | 4.391 |
| 2300 | 986 | 1617.5 | 3.2822 | 1045.0 | 365.8 | 2902.8 | 79.9 | 4.542 |
| 2350 | 974 | 1579.4 | 3.2433 | 1118.4 | 383.3 | 3091.8 | 82.6 | 4.695 |
| 2400 | 963 | 1543.4 | 3.2062 | 1195.0 | 401.2 | 3289.0 | 85.4 | 4.850 |
| 2450 | 952 | 1508.7 | 3.1699 | 1274.8 | 419.3 | 3494.2 | 88.1 | 5.007 |

*FIG. 8B*

GUNSIGHT AND RETICLE THEREFOR

RELATED APPLICATIONS

This application is a continuation-in-part of U.S. patent application Ser. No. 09/519,124 filed on Mar. 6, 2000 now U.S. Pat. No. 6,453,595 which is a continuation-in-part of Ser. No. 09/129,729 U.S. Pat. No. 6,032,374 filed Aug. 5, 1998, which is a continuation-in-part of Ser. No. 08/986,458 U.S. Pat. No. 5,920,995 filed Dec. 8, 1997.

BACKGROUND OF THE INVENTION

The present invention relates to telescopic gunsights, and more particularly to reticles for use in telescopic gunsights.

All shooters, whether they are police officers, olympic shooters, or weekend enthusiasts, have one common goal: hitting their target accurately and consistently. Accuracy and consistency in shooting depend largely on the skill of the shooter and the construction of the firearm and ammunition.

The accuracy of a firearm can be enhanced by the use of precisely-made components, including precisely-made ammunition. It is well known in target shooting that using ammunition in which the propellant weight and type, bullet weight and dimensions, and cartridge dimensions are held within very strict limits, can improve accuracy in shooting.

At very long ranges, in excess of 500 yards, however, the skill of the shooter and the consistency of the ammunition is often not enough to insure that the shooter will hit the target. As range increases, other factors can affect the flight of the bullet and the point of impact down range. One of these factors is "bullet drop". "Bullet drop" is caused by the influence of gravity on the moving bullet, and is characterized by a bullet path which curves to earth over long ranges. Therefore to hit a target at long range, it is necessary to elevate the barrel of the weapon, and the aiming point, to adjust for bullet drop. Other factors, such as wind, magnus effect (i.e., a lateral thrust exerted by wind on a rotating bullet whose axis is perpendicular to the wind direction), bullet design, and the idiosyncracies of the weapon can cause the bullet to drift to the left or right of the central path of the bullet over long range. Such effects are generally referred to as "windage" effects. Therefore, to hit a target at long range, it may be necessary to correct for windage by moving the barrel of the weapon slightly to the left or the right to compensate for bullet drift. Thus, in order to hit a target at long range, the shooter must see the target, accurately estimate the range to the target, estimate the effect of bullet drop and wind on the bullet, and use this information to properly position the barrel of the firearm prior to squeezing the trigger. Conventional telescopic gunsights or scopes are not generally useful at long ranges in excess of 600–800 yards. The cross-hairs of such scopes are typically located in the center of the field, with the vertical hair providing a central indicator for making a windage adjustment, and the horizontal hair providing a central indicator for making a bullet drop adjustment. Modifications to this basic system have not, thus far, enabled a skilled shooter firing at long ranges to acquire and hit a target quickly and reliably, regardless of the weapon used (assuming always that the weapon is capable of reaching a target at the desired long range).

For example, U.S. Pat. No. 1,190,121 to Critchett, discloses a reticle for use in a rifle scope containing a rangefinder having markings for finding a range with reference to the height of a man. Apparently because of the innate variation in the height of any given individual from that used to produce the reticle, and the resulting inaccuracy which that would produce at long ranges, Critchett's scope was only useful to 600 yards.

U.S. Pat. No. 3,948,587 to Rubbert discloses a reticle and telescope gunsight system having primary cross-hairs which intersect conventionally at the center of the field, and secondary horizontal cross-hairs spaced apart by different amounts to form a rangefinder and distinct aiming apertures and points, based upon a predetermined, estimated size of a target. Rubbert's preferred embodiment is constructed for use in shooting deer having an 18" chest depth. However, like Critchett, the usefulness of Rubbert for shooting other targets of varying size at long range is doubtful.

U.S. Pat. No. 3,492,733 to Leatherwood discloses a variable power scope having aiming cross-hairs and two upper cross-hairs for bracketing a target of known dimensions at a known distance. The scope is mounted to a gun barrel, and the position of the scope in relation to the gun barrel is adjustable up and down to compensate for bullet drop by covering the target with the bracketing cross-hairs, and rotating an adjustment ring to expand or contract the bracketing cross-hairs to bracket the target. Leatherwood's scope, like the others discussed above, has limited utility at long ranges because it is designed with a specific size target in mind, and would therefore be inaccurate when used with targets of widely varying size, and also because at long range the scope may not be able to move sufficiently in relation to the barrel (i.e., may be obstructed by the gun barrel).

U.S. Pat. No. 4,403,421 to Shepherd discloses a scope having a primary and secondary reticles, the secondary reticle being a polygonal reticle with different indicia on the different faces which can be rotated into position to compensate for bullet drop and determining target range for different sized targets. However, having to rotate a secondary reticle to locate an appropriate target shape in order to determine the range is time consuming and undesirable, since it takes the shooter's attention away from the target.

It should be noted that the range finding inaccuracies inherent in these prior art references may be resolved using a laser rangefinder. However, since a laser rangefinder often emits a visible light, there is always the possibility that the beam from a laser rangefinder could be detected, revealing the position of the shooter, causing a live target to move, or other undesirable consequences, before the shot can be taken. Furthermore, a laser rangefinder includes complex electronics which must be handled with care. Laser rangefinders require highly reflective or broadside targets to achieve range. Finally, a laser rangefinder must be powered with electricity from a source which must be carried by the shooter. The additional weight is a burden, and the possibility exists that power source could fail or become exhausted through use, causing the rangefinder to cease working.

Accordingly, the need exists for a telescopic gun sight having a reticle which includes an optical rangefinder which permits a skilled shooter to rapidly and accurately identify the range to any target of estimable size, no matter how large or small, to make fast and accurate adjustment for bullet drop and windage, using the shooter's knowledge and experience and without the need to move rings or make adjustments to the scope, thus enabling the shooter to accurately hit targets at any range, depending upon the eyesight of the shooter and the maximum range of the selected firearm.

SUMMARY OF THE INVENTION

In one embodiment, the present invention provides an improved telescopic gunsight having a housing, including a means for mounting the housing in a fixed, predetermined position relative to a gun barrel, an objective lens mounted in one end the housing, an ocular lens mounted in the opposite end of the housing, a reticle mounted in the housing between the objective lens and the ocular lens, the reticle having an optical center, a primary vertical cross-hair intersecting the optical center of the reticle, a primary horizontal cross-hair intersecting said primary vertical cross-hair at a position above the optical center when the housing is mounted to the gun barrel, to form an upper right quadrant, an upper left quadrant, a lower left quadrant, and a lower right quadrant, a plurality of secondary horizontal cross-hairs evenly spaced along the primary vertical cross-hair, a plurality of secondary vertical cross-hairs evenly spaced along at least some of said secondary horizontal cross-hairs, and rangefinder markings positioned in one of the quadrants. The telescopic gunsight of this embodiment can be a fixed power scope or a variable power scope. When optics are mounted in the housing to permit the power to be varied along a predetermined range, the reticle is most preferably mounted between the objective lens and the variable power optics.

In another embodiment, the present invention provides a reticle for use in any conventional telescopic gunsight, whether such telescopic gunsight is a fixed power scope or a variable power scope. A reticle of this embodiment is preferably constructed from an optically transparent wafer or disc having an optical center which coincides with a center of a field of vision when the wafer is mounted in a scope. A primary vertical cross-hair having a predetermined thickness bisects the disc, intersecting the optical center of the disc. A primary horizontal cross-hair having a predetermined thickness intersects the primary vertical cross-hair, most preferably above the optical center of the disc, to form an upper right quadrant, an upper left quadrant, a lower left quadrant, and a lower right quadrant. A plurality of secondary horizontal cross-hairs having predetermined thickness are evenly spaced along the primary vertical cross-hair. Preferably, at least some of these secondary horizontal cross-hairs are identified with a unique identifier, to aid the shooter in locating the appropriate horizontal cross-hair to use in selecting an aiming point. A plurality of secondary vertical cross-hairs having predetermined thickness are evenly spaced along at least some of said secondary horizontal cross-hairs to aid in making accurate windage adjustments. Finally, a separate range-finding means is positioned in one of said quadrants to aid the shooter in determining the range to target.

The present invention can also be adapted for use in a mid-range telescopic gunsight. A mid-range reticle, almost identical to the long-range reticle described above, can be constructed in accordance with this invention. Since the mid-range reticle requires less lower field area, the primary horizontal cross-hair can be conventionally centered. The mid-range reticle can then be calibrated and used in the same manner as a long-range reticle.

The reticle can also be provided with a circumscribing ring visible through the gunsight, to aid in centering the eye relative to the telescopic gunsight. This ring helps reduce shooting inaccuracy caused by the misalignment of the shooter's line of sight through the scope. By providing a visual means to align the reticle within the scope, the shooter can produce more accurate and more repeatable results.

The reticle can also be provided with an aiming/centering dot located at the optical center of the reticle for rapid acquisition of a target at medium range, and for aiding the shooter in centering his eye relative to the field of view.

In yet another embodiment, a portion of the primary vertical cross-hair or the primary horizontal cross-hair can be provided with rangefinder markings to eliminate the need for a separate rangefinder in one of the quadrants formed by the primary vertical and horizontal cross-hair.

Other embodiments will be evident from a consideration of the drawings taken together with the detailed description of the invention.

BRIEF DESCRIPTION OF THE DRAWINGS

A better understanding of the invention and its advantages will be apparent from the detailed description taken in conjunction with the accompanying drawings in which:

FIG. 5 is an example of 500 yard zero ballistic table created for a .50 Cal. Bolt Action Model M-93 Rifle having a 30 inch barrel built firing a .50 Cal Browning Machine Gun cartridge;

FIG. 6 is an example of a worksheet which can be used to calibrate the markings on a reticle of the present invention;

FIG. 8 is an illustrative table providing data for determining an appropriate windage adjustment for the example;

DETAILED DESCRIPTION OF THE INVENTION

Figure 1:
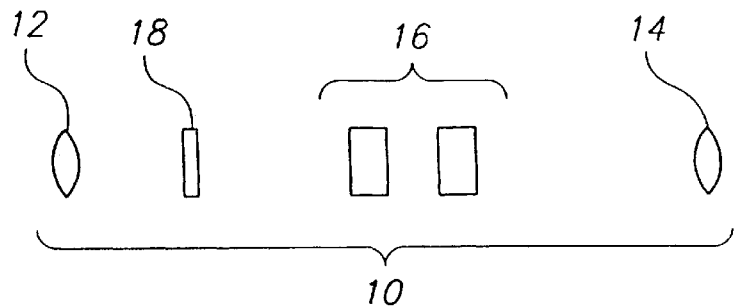
FIG. 1 is a diagram showing the optical components of a telescopic gunsight of the present invention.
Figure 4:
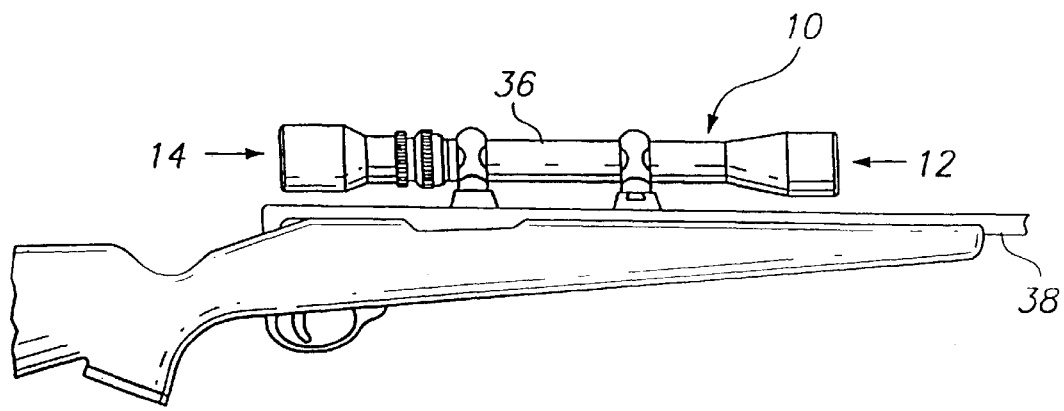
FIG. 4 is a partial side view of a firearm showing a telescopic gunsight mounted on the barrel.

As shown in FIGS. 1 and 4, a telescopic gunsight 10 (also referred to herein as a "scope") includes a housing 36 which can be mounted in fixed relationship with a gun barrel 38. Housing 36 is preferably constructed from steel or aluminum, but can be constructed from virtually any durable, substantially non-flexible material which is useful for constructing optical equipment. Mounted in housing 36 at one end is an objective lens or lens assembly 12. Mounted in housing 38 at the opposite end is an ocular lens or lens assembly 14. It is well known in the art to make such lenses from either a single piece of glass or other optical material (such as transparent plastic) which has been conventionally ground and polished to focus light, or from two or more pieces of such material mounted together with optically transparent adhesive and the like to focus light. Accordingly, the term "lens" as used herein is intended to cover either a lens constructed from a single piece of optical glass or other material capable of focusing light, or from more than one pieces mounted together to focus light. As will be understood by one having skill in the art, when the scope 10 is mounted to a gun barrel 38, the objective lens 12 faces the target, and the ocular lens 14 faces the shooter's eye.

Other optical components which may be included in housing 36 include variable power optical components 16 for a variable power scope. Such components 16 typically include magnifiers and erectors. Such a variable power scope permits the user to select a desired power within a predetermined range of powers. For example, with a 3–12× 50 scope, the user can select a lower power (i.e., 3×50) or a high power (i.e., 12×50) or any power along the continuous spectrum in between.

Figure 3:
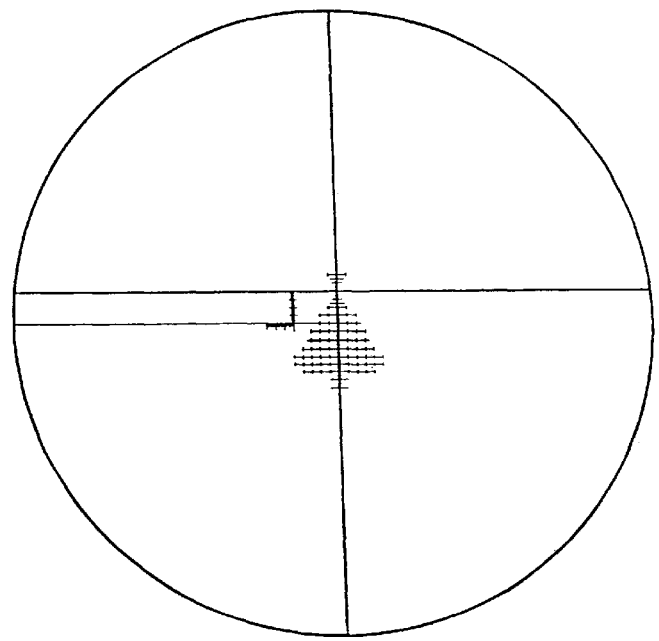
FIG. 3 is a front view of a reticle of the present invention, showing the markings as viewed through a zoom telescopic gunsight at low power.

Finally, a reticle is typically included to assist the shooter in hitting the target. The reticle is typically (but not necessarily) constructed using optical material, such as optical glass or plastic, and takes the form of a disc or wafer with substantially parallel sides. In a fixed power scope, the reticle can be mounted anywhere between the ocular lens 14 and the objective lens 12. In a variable power scope, the reticle is most preferably mounted between the objective lens 12 and the optical components 16. In this position, the apparent size of the reticle when viewed through the ocular lens will vary with the power; for example, compare FIG. 2 (high power) with FIG. 3 (low power). When a reticle of the present invention is mounted in a variable power scope, I prefer a variable power scope manufactured by Schmidt & Bender GmbH & Co. KG of Biebertal, Germany, because of its excellent optics. With a Schmidt & Bender Scope, such as a 3–12×50 or a 4–16×50, when the reticle is mounted between the objective lens and the variable power optical components 16, I have found that the selected aiming point (as described in more detail below) on my reticle does not vary as the shooter zooms the scope in and out to find the most desirable power for a particular shot.

Figure 2:
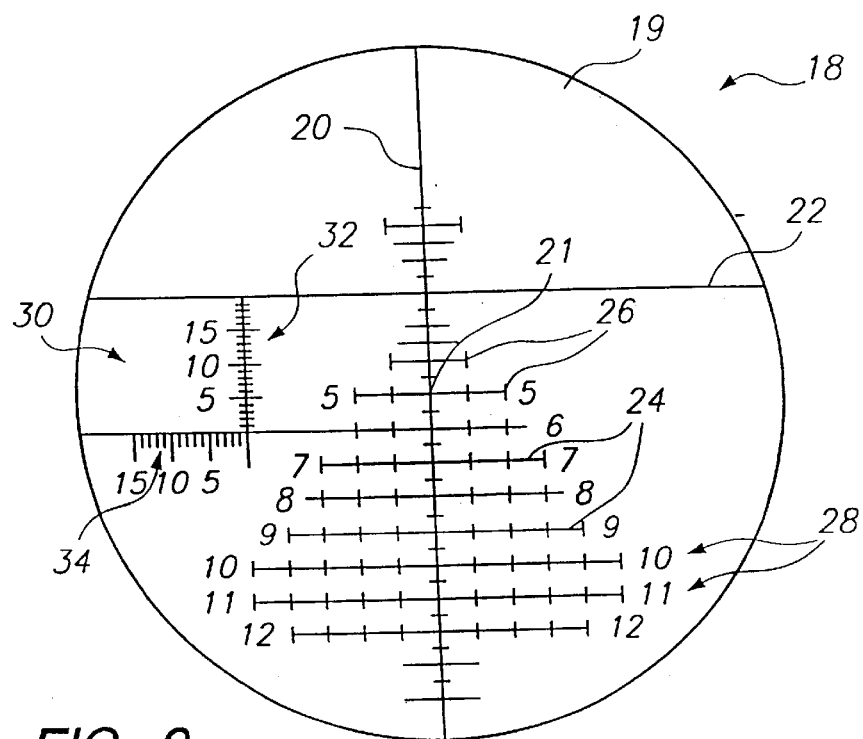
FIG. 2 is a front view of a reticle of the present invention, showing the markings as viewed through a zoom telescopic gunsight at high power, the spacing of the markings based upon an "inch of angle" scale.
Figure 9:
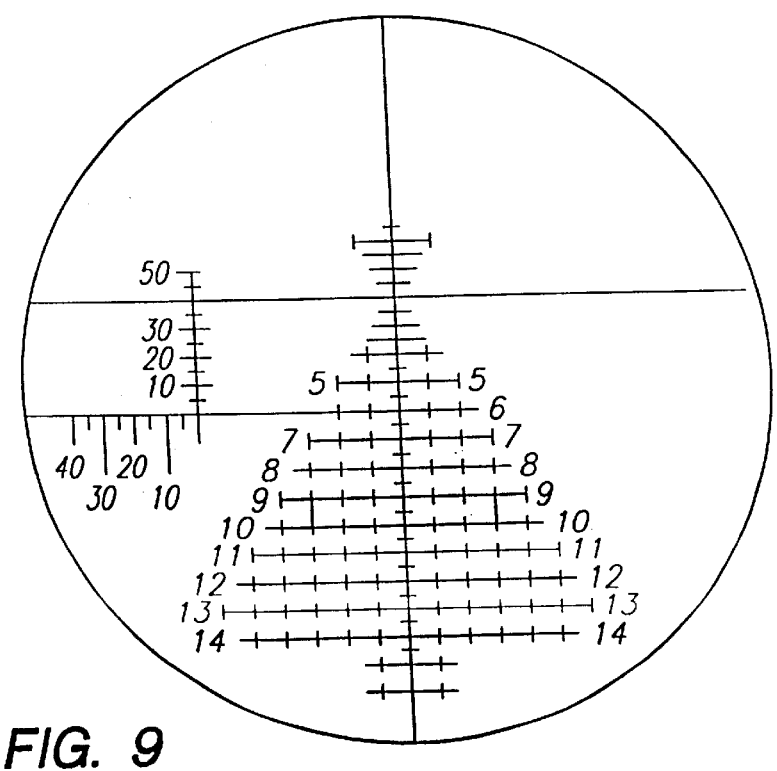
FIG. 9 is a reticle of the present invention based upon a "centimeter of angle" scale.

As shown in FIG. 2, the preferred reticle 18 of the present invention is formed from a substantially flat disc or wafer 19 formed from substantially transparent optical glass or other material suitable for manufacturing optical lenses. Disc 19 has two, substantially parallel, sides. A primary vertical cross-hair 20 is provided on one side of said disc 19 using conventional methods such as, for example, etching, printing, or applying hairs or wires of known diameter. Etching is preferred. Primary vertical cross-hair 20 preferably bisects the disc 19 and intersects the optical center 21 of reticle 18. A primary horizontal cross-hair 22 is also provided, and most preferably intersects the primary vertical cross-hair at a position well above the optical center 21. Positioning the primary horizontal cross-hair in this way provides the necessary additional field of view necessary to shoot accurately at long ranges. Thus, the primary vertical cross-hair and the primary horizontal cross-hair form four quadrants: an upper right quadrant, an upper left quadrant, a lower left quadrant, and a lower right quadrant, when viewed through a scope properly mounted to a gun barrel as shown in FIG. 4.

A plurality of evenly-spaced, secondary horizontal cross-hairs 24 are provided along the primary vertical cross-hair 20, preferably both above and below the primary horizontal cross-hair 22 to aid in range adjustments and for locating an appropriate aiming point on the reticle with respect to the distance to the target. Some of these secondary, horizontal cross-hairs are provided with unique symbols 28 which are useful in quickly locating a particular horizontal cross-hair. Symbols 28 can be numbers, as shown in FIG. 2, letters or other symbols. Symbols 28 are used for identification purposes only.

A plurality of evenly-spaced, secondary vertical cross-hairs or hash-marks 26 are provided on at least some of the secondary horizontal cross-hairs 24, to aid the shooter in making adjustments for windage and for locating an appropriate aiming point on the reticle with respect to both windage and range.

Also provided, most preferably in the lower left quadrant, is a means for determining range. As shown in FIG. 2, the rangefinder 30 includes a vertical arm 32 and an intersecting horizontal arm 34. Vertical arm 32 is provided with a plurality of evenly-spaced horizontal cross-hairs which intersect vertical arm 32; horizontal arm 34 is provided with a plurality of evenly-spaced, preferably downwardly extending cross-hairs. At least some of the range finding cross-hairs are marked to correspond to a scale useful for determining range.

The spacing between the range-finding cross-hairs is most preferably based upon a non-conventional scale, which I refer to as the "inches of angle" scale. An "inch of angle" is defined as the angle made (or the distance on the reticle) which covers exactly one inch at 100 yards. On the reticle shown in FIG. 2, an inch of angle is the distance between any two adjacent rangefinder cross-hairs. That is, the space between any two adjacent rangefinder cross-hairs will cover or exactly contain a one-inch target at 100 yards. A similar scale for metric shooters, which I call a "centimeters of angle" scale, can also be used, with a centimeter of angle being the distance on the reticle which covers exactly one centimeter at 100 meters. Conventional scales, such as the "minute of angle" scale or Mil Radian scale, can also be used, but are not preferred because they are less intuitive to use and make the accurate estimation of long ranges more difficult.

The spacing between secondary cross-hairs on the primary vertical and horizontal cross-hairs are also determined with reference to the scale used for the rangefinder. For the reticle as shown in FIG. 2, it can be seen by reference to the rangefinder that the spacing between the secondary horizontal cross-hairs labeled 5 and 6 is 5 inches of angle. A shorter secondary horizontal cross-hair (or hash-mark) appears between horizontal cross-hairs 5 and 6, at a position 2.5 inches of angle from either secondary horizontal cross-hair 5 or 6. The secondary vertical cross-hairs 26, as shown in FIG. 2, are spaced apart by 5 inches of angle.

The thickness of the lines are also preferably determined with reference to the range-finding scale used. For the preferred embodiment shown in FIG. 2, the preferred thickness of the primary vertical cross-hair 20 and primary horizontal cross-hair 22 is 0.5 inches of angle and the preferred thickness of the secondary horizontal and vertical cross-hairs are 0.25 inches of angle. The rangefinder arms 32, 34 and the marked (5, 10, 15) rangefinder cross-hairs are preferably 0.25 inches of angle thick, and the intermediate range-finding cross-hairs are preferably 0.1 inches of angle thick.

Figure 13:
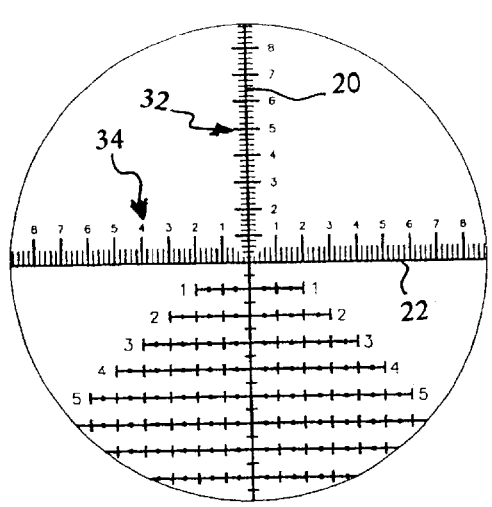
FIG. 13 is a front view of a reticle of the present invention in which the upper portion of the primary vertical cross-hair and the primary horizontal cross-hair have been provided with range-finder markings of a USMC mil-dot scale.
Figure 14:
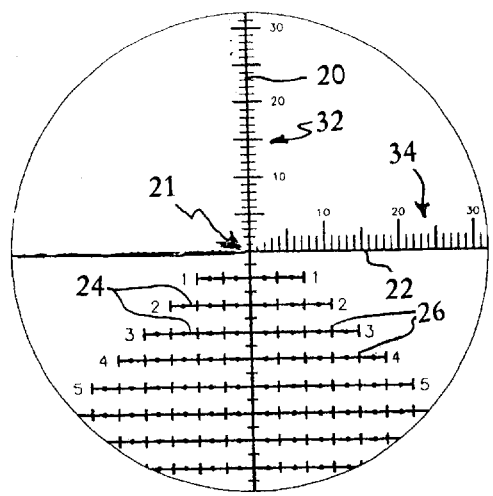
FIG. 14 is a front view of a reticle of the present invention in which the upper portion of the primary vertical cross-hair and the primary horizontal cross-hair have been provided with range-finder markings of an "inches of angle" scale; and, FIG. 15 is a front view of a reticle of the present invention in which a horizontal range-finder bar intersects the primary vertical cross-hair at a position above the intersection with the primary horizontal cross-hair, and primary vertical cross-hair and horizontal rangefinder bar have been provided with range-finder markings of any desirable scale.
Figure 15:
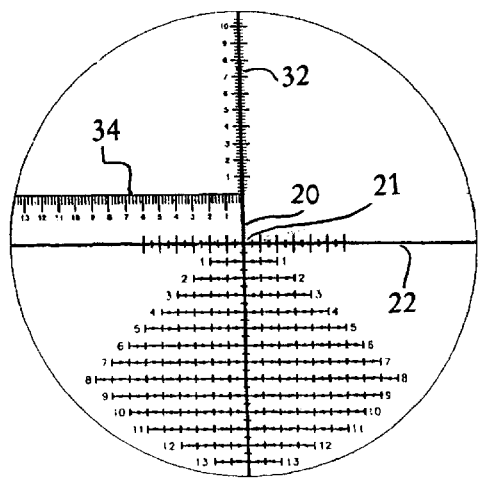

As shown in FIGS. 13–15, I have also found it possible to use the primary vertical cross-hair 20 and/or primary horizontal cross-hair 22 as the rangefinder, obviating the need for additional lines in any quadrant formed by the intersecting primary vertical and horizontal cross-hairs. This is preferred because it provides a less cluttered, and therefore less distracting, field of view.

As shown in FIG. 13, the upper portion of the primary vertical cross-hair 20 can be provided with range finder markings of any scale to form a rangefinder vertical arm 32. Likewise, substantially the entire primary horizontal cross-hair 22 can be provided with range finder markings of any scale to form a rangefinder horizontal arm 34. Typical scales include the "inches of angle" or "centimeters of angle" scale introduced by the parent and grandparent applications from which this application claims priority, as well as conventional scales such as USMC Mil Dot Scale or minute of angle scales can also be used.

As shown in FIG. 14, the rangefinder horizontal arm 34 can be superimposed over only a portion of the primary horizontal cross-hair 22. Although FIG. 14 illustrates an example where the rangefinder horizontal arm 34 is located to the right of the intersection 21 between the primary vertical cross-hair 20 and the primary horizontal cross-hair 22, one skilled in the art will realize that the rangefinder horizontal arm 34 could just as easily be located to the left of intersection 21. The scale on the rangefinder markings can, if desired, be drawn to a different scale from that provided for the line thickness and spacing between the secondary vertical cross-hairs 26 and secondary horizontal cross-hairs 24. For example, it may be desirable for an experienced shooter to provide the rangefinder markings in an inches of angle scale to speed up the process of determining the range to target, and then have the spacing between the secondary horizontal cross-hairs 24 and secondary vertical cross-hairs 26 provided in a more conventional (and hence more familiar) scale that the experienced shooter can use to calibrate and shoot the weapon, such as, for example, a USMC Mil Dot Scale.

It is also possible to superimpose only one arm of the rangefinder on either the primary vertical cross-hair 20 or the primary horizontal cross-hair 22. As shown in FIG. 15, the rangefinder vertical arm 32 can be superimposed over the primary vertical cross-hair 32 with a rangefinder horizontal arm 34 extending into an upper quadrant and intersecting the primary vertical cross-hair 20 at a position above intersection 21. Although FIG. 15 shows the rangefinder horizontal arm 34 extending into the upper left quadrant, it could just as easily be positioned in the upper right quadrant. Likewise, the rangefinder horizontal arm 34 could be superimposed over the primary horizontal cross-hair 22 and a rangefinder vertical arm 32 could intersect the primary horizontal cross-hair 22 at a position to the left or to the right of intersection 21 and extend upwards into the left or right quadrants.

To use a scope and reticle of the present invention, it is preferred that the shooter become familiar with the characteristics of the weapon and ammunition to be used. The scope and reticle can be calibrated to work with almost any type of rifle. To calibrate the scope and reticle, the shooter first determines the ballistics based upon the characteristics of the weapon and ammunition to be used. For example, let us suppose the weapon to be used is a .50 caliber Bolt Action Rifle, Model M-93 with a 30 inch barrel built by Harris Gunworks in Phoenix, Ariz. The cartridge selected is .50 Cal Browning Machine Gun cartridge, each of which is constructed from a brass case (made by Winchester), primer (CCI #35); powder (218 grains ACC #8700 by Accurate Aims Powder), and bullet (750 grain AMAX Match bullet by Hornady, ballistic coefficient 0.750). A computer can then be used to run a ballistics program to determine bullet drop for this weapon/ammunition combination. I prefer a software program by W. R. Frenchu entitled "Ballistic V.4.0" which was copyrighted 1988 and is based upon Ingalls' table. However, other software programs, such as "Ballistic Explorer for Windows," sold by Oehler Research of Austin, Tex., may also be used. After inputting the necessary data for the cartridge and other data such as altitude, temperature, atmospheric pressure, etc., the computer can calculate points of impact for various ranges. See, e.g., FIG. 5, which provides a table with a zero at 500 yards. Other tables can be calculated with zero values at other ranges. 500 yards has been selected here solely for the purposes of illustration. To assist the shooter in understanding how to "calibrate" the reticle, a worksheet, such as that illustrated in FIG. 6 can be used.

Next, the shooter can select the size of the bulls eye (or target area) to be hit using a reticle of the present invention. For example, a selected bulls eye could be 6 inches in diameter, 10 inches in diameter, 12 inches, 36 inches, 48 inches etc. A hit anywhere in the bulls eye counts as a direct hit. For the purposes of this example, I used a 12 inch bulls eye from a range of point blank to 1000 yards and a 36 inch bulls eye from 1100 yards to 1650 yards.

When the shooter sees the reticle through the eyepiece, the secondary horizontal cross-hairs can be seen. These cross-hairs are evenly spaced 2.5 inches of angle apart. Thus, the spacing between the primary horizontal cross-hair 22 shown in FIG. 2, and the first secondary horizontal cross-hair below the primary horizontal cross-hair 22 is 2.5 inches of angle. The spacing between the primary horizontal cross-hair 22 and the secondary horizontal cross hair labeled "5" is 15 inches of angle. This means that adjacent cross-hairs would span a 2.5 inch target at 100 yards. The space between the primary horizontal cross-hair and the secondary horizontal cross-hair labeled "5" would cover a 15 inch target at 100 yards. At 200 yards, adjacent cross-hairs will span a target of 5 inches, and the space between the primary horizontal cross-hair and the secondary cross-hair labeled "5" would cover a 30 inch target. At 600 yards, adjacent cross-hairs will span a target of 15 inches, the space between the primary horizontal cross-hair and the secondary horizontal cross-hair labeled "5" would cover a 90 inch target, and so on. As can be seen, there is a linear relationship between the inches of angle scale and the range to the target in yards.

Figure 6:
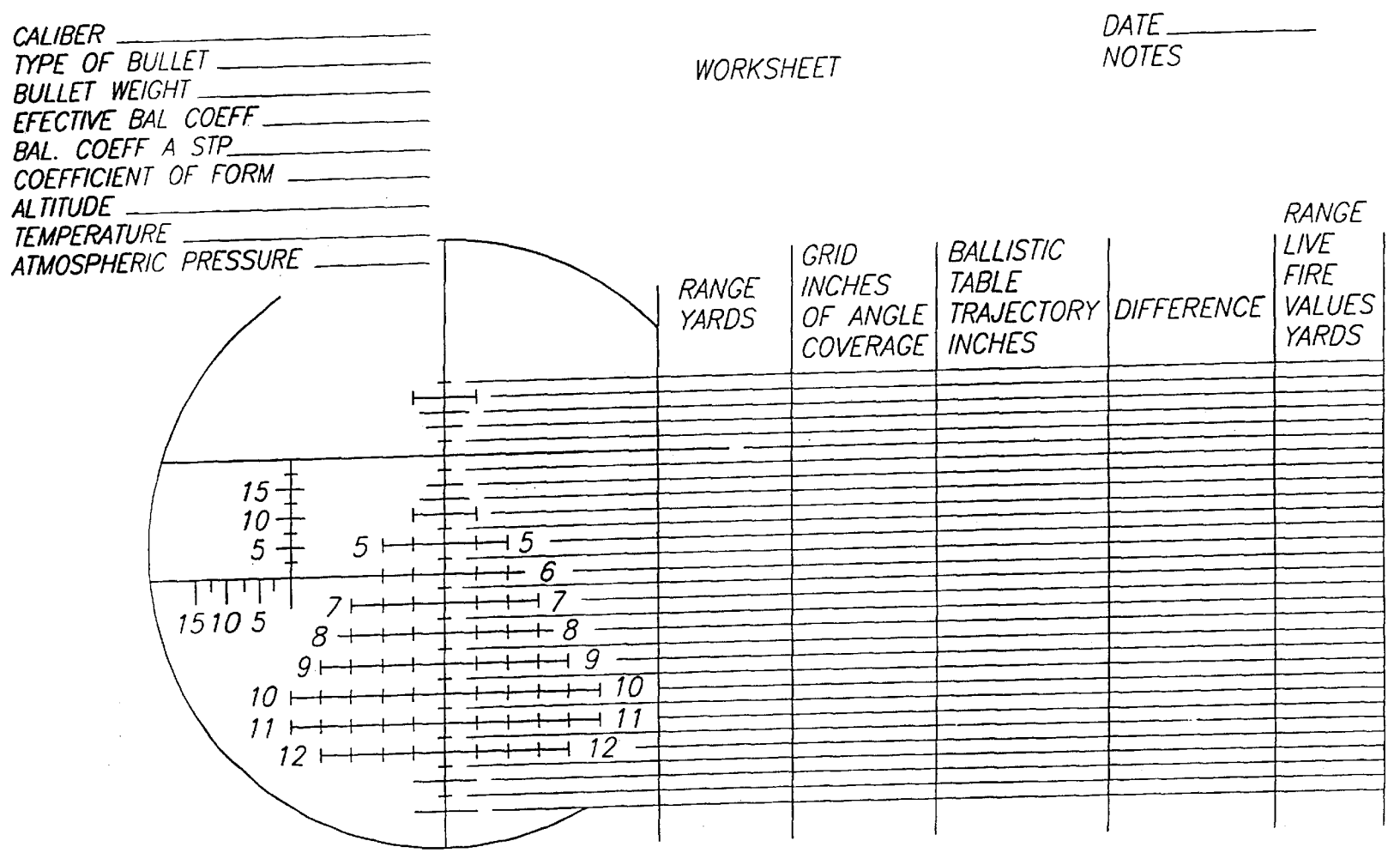

Using a table such as that shown in FIG. 5, and a worksheet, such as that shown in FIG. 6, the shooter can "calibrate" a scope of the present invention for the particular weapon and ammunition selected. For this example, a 500 yard zero table was selected for purposes of illustration. Therefore, the shooter marks the primary horizontal cross-hair 22 on the worksheet with the number 500 (e.g., if the target were exactly 500 yards down range, the shooter would select an aiming point along the primary horizontal cross-hair 22 to hit the target). The range value of the first secondary horizontal cross-hair below the primary horizontal cross-hair can then be calculated. Estimating a value of between 600 and 700 yards, the shooter can determine the closest value by calculating the inches of angle at 600 and 700 yards (which corresponds to bullet drop)

$$\frac{2.5 \text{ inches of angle}}{100 \text{ yards}} \times 600 \text{ yards} = 15.10 \text{ inches of angle}$$

$$\frac{2.5 \text{ inches of angle}}{100 \text{ yards}} \times 700 \text{ yards} = 17.50 \text{ inches of angle}$$

These calculated values are matched with the values shown in the selected Ingalls table (in this example, the 500 yard zero table shown in FIG. 5). The 600 yard range on the table shows a trajectory of 18.4 inches. The 700 yard range on the table shows a trajectory of −44.6 inches. Since the calculated bullet drop at the first secondary horizontal marker is 15.1 inches, and this most closely correlates with the trajectory shown in the Ingalls table for 600 yards (−18.4 inches), the first secondary horizontal cross-hair below the primary horizontal cross-hair is marked on the worksheet as 600 yards. Although the actual bullet impact should be 3.3 inches below the dead center of the 12 inch diameter bulls eye (18.4−15.1=3.3), this is close enough since a hit is considered to be anything within the 12 inch bulls eye.

Figure 7:
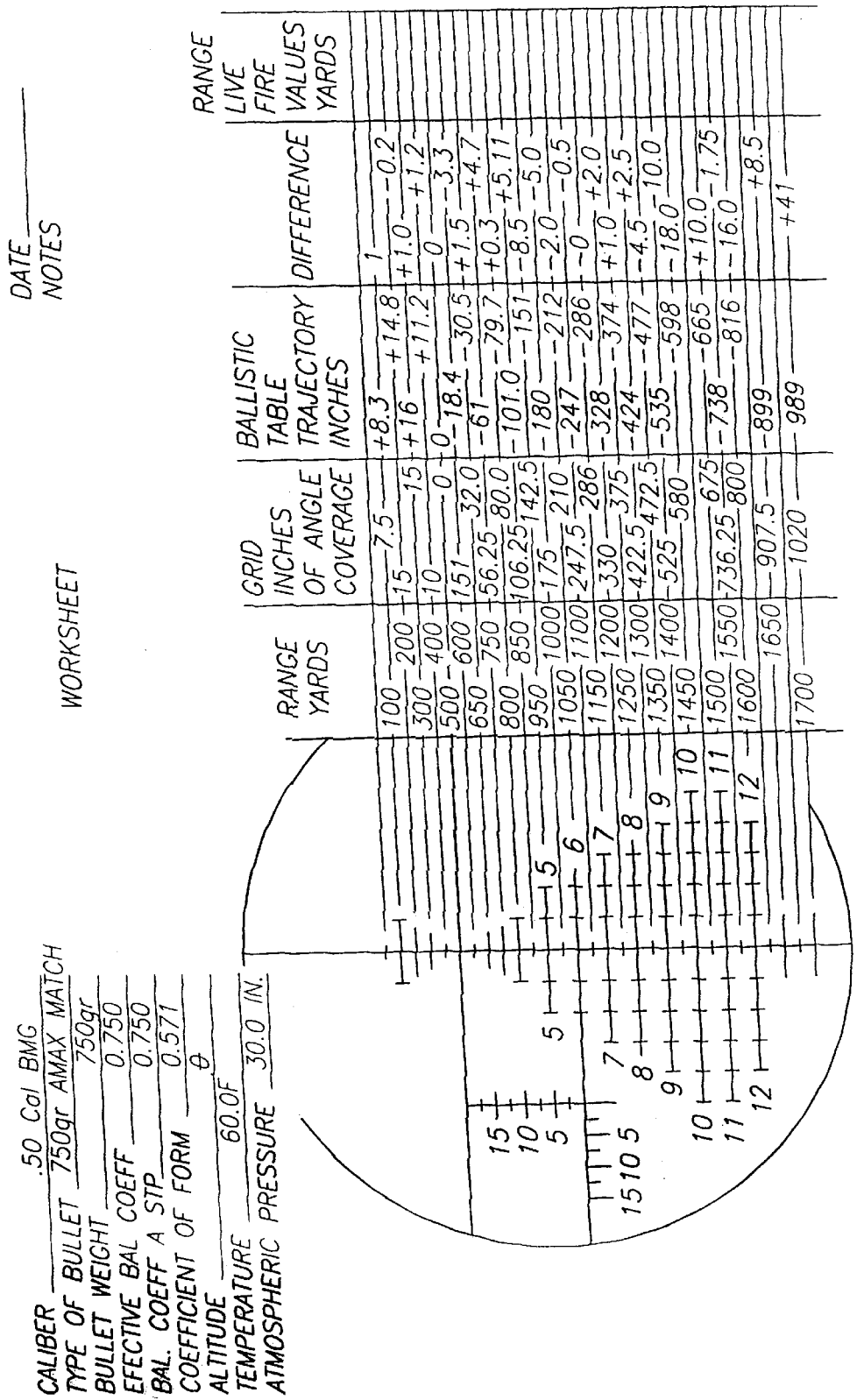
FIG. 7 is a completed worksheet based upon the table shown in FIG. 5.

The shooter can then repeat this process to calibrate the reticle for every secondary horizontal cross-hair below the primary horizontal cross-hair. The results in this example can be used to shoot at any target within a range up to 1700 yards. The results using this method can be seen in FIG. 7. Longer ranges can also be calibrated using a zero table for a longer range (e.g., anything from a 600 yard zero table to a 2500 yard zero table).

Alternatively, the shooter can locate the secondary horizontal cross-hair to use for an aiming point for a specific range. For example, using the same 500 yard zero chart found in FIG. 5, if the shooter wishes to hit a target at 1100 yards, he estimates two or three secondary horizontal cross-hairs which should bracket the correct secondary horizontal cross-hair to use as an aiming point. The shooter guesses the correct cross-hair is between the cross-hair identified as 6 and the cross-hair identified as 8. He then performs the same calculation:

| Cross-hair #6: | $\frac{20 \text{ inches of angle}}{100 \text{ yards}} \times 1100 \text{ yards} = 220 \text{ inches of angle}$ |
|---|---|
| Cross-hair #7: | $\frac{25 \text{ inches of angle}}{100 \text{ yards}} \times 1100 \text{ yards} = 275 \text{ inches of angle}$ |
| Cross-hair #8: | $\frac{30 \text{ inches of angle}}{100 \text{ yards}} \times 1100 \text{ yards} = 330 \text{ inches of angle}$ |

Looking at the 500 yard table, the bullet drop at 1100 yards is 247 inches. This looks fairly close to mid-way between. To double check this estimate, the shooter can run the calculation for the unlabeled secondary horizontal cross-hair between cross-hair 6 and cross-hair 7, which is located 22.5 inches of angle below the primary horizontal cross-hair:

$$\frac{22.5 \text{ inches of angle}}{100 \text{ yards}} \times 1100 \text{ yards} = 247.5 \text{ inches of angle}$$

This value most closely approximates the trajectory according to the 500 yard zero Ingalls table used for this example, and, if used should correspond to a point exactly 0.5 inches off dead center.

Once the scope has been calibrated for the weapon and ammunition specified, the shooter can test the calculated values against actual performance at a range. The values generated using computer projections, ballistic tables and calculations are only a guide; however, they should be quite close to actual performance. It is preferred that the final range value assigned to each secondary horizontal cross-hair should be based on an actual line firing test of the selected weapon and ammunition at various ranges. A minimum of three shots should be used for the final confirmation of the estimated values.

Once the reticle has been calibrated as described above, it can be used in the field to acquire and hit targets of all sizes at very long, unknown ranges. While the preferred range for the preferred embodiment is at least 500 yards to 2500 yards (assuming the weapon/ammunition combination selected are capable of accurately hitting a target at these ranges), a scope of the present invention could be used to hit targets at shorter ranges, as well as longer ranges, limited only by the capacity of the weapon and the eyesight of the shooter.

The preferred rangefinder, shown in FIG. 2, can easily be used to accurately determine the range to a target whose size is known or can be estimated. For example, for a 36 inch bull's-eye target placed at an unknown distance from the shooter, the shooter need only align the right edge of the target with the vertical arm 32 of the rangefinder so that the horizontal arm 34 of the rangefinder appears to pass through the center of the bull's-eye target. If, for example, the left edge of the target extends to the cross-hair corresponding to 6 inches of angle, then the observed size of the target is 6 inches of angle, and the range to target is calculated to be:

$$\text{Range (yards)} = \frac{\text{target's actual size (inches)} \times 100}{\text{observed inches of angle on rangefinder}}$$

or, in this example, $$\text{Range (yards)} = \frac{36 \times 100}{6} = \frac{3600}{6} = 600 \text{ yards}$$

As a further example, suppose that the shooter observes a moose in the distance, eating vegetables from a garden near a house. From a comparison with a door in the house, the shooter estimates the size of the moose to be 6 feet at the shoulder. Upon viewing this target in the reticle, the shooter aligns the horizontal arm 34 of the rangefinder with the ground level upon which the moose is standing, and the vertical arm 32 of the rangefinder with the moose's shoulder. The shooter determines that the moose's shoulder touches the cross-hair marked 5. The range can then be calculated as follows:

$$\text{Range}=72/5\times100=1440 \text{ yards}$$

Once range has been determined, the shooter can then select the appropriate aiming point on the calibrated reticle, without the need for taking his eye off the target and without the need of making any adjustments to the scope.

Because it is often not possible to accurately estimate windage problems down range, particularly over long ranges, it is easiest for the experienced shooter to use the reticle of the present invention to correct after a shot is observed to drift. As noted above, the secondary vertical cross-hairs are evenly spaced every 5 inches of angle, which provides a scale for adjusting a second shot towards the target. For example, a 50 cal. bullet is fired at a target 1500 yards away. The intersection between the primary vertical cross-hair and the secondary horizontal cross-hair identified by number 11 is the selected aiming point. The bullet was observed to drift approximately two secondary vertical cross-hairs to the right of center. To correct for this drift, the shooter need only shift the aiming point to the intersection between the second vertical cross-hair to the right of the primary vertical cross-hair and the horizontal cross-hair identified by number 11, effectively moving the barrel of the weapon left the appropriate distance to compensate for windage. Likewise, if the bullet passes the target too high or too low, the shooter can use the secondary horizontal markings to adjust for range. For example, if the bullet is observed to pass two secondary horizontal markings above the selected aiming point when it passes the target, the shooter can quickly adjust by shifting his aiming point up two secondary horizontal cross-hairs, thus depressing the barrel of the firearm.

If it is not possible to visually determine bullet drift, the shooter can use a table which takes into account local conditions, the weapon, and ammunition to determine the amount of deflection over a selected range. See FIG. 8 for an illustrative table. With the conditions as stated in FIG. 8, and for a wind crossing from the left of the shooter to the right, the expected deflection of the bullet at 1000 yards would be 54.1 inches to the right. The aiming point for windage can be easily calculated:

$$\frac{\text{inches of angle on horizontal cross-hair}}{100 \text{ yards}} \times 1000 \text{ yards} = 54.1 \text{ inches}$$

$$\frac{\text{inches of angle on}}{\text{horizontal cross-hair}} = \frac{54.1 \text{ inches} \times 100 \text{ yards}}{1000 \text{ yards}} = 5.41$$

Thus, the shooter can correct for windage on a first shot by choosing the intersection between the correct secondary horizontal cross-hair for 1000 yards, and the first secondary vertical cross-hair to the right of the primary vertical cross-hair (which, as indicated above for the preferred embodiment, is spaced 5 inches of angle away from the primary vertical cross-hair).

Figure 10:
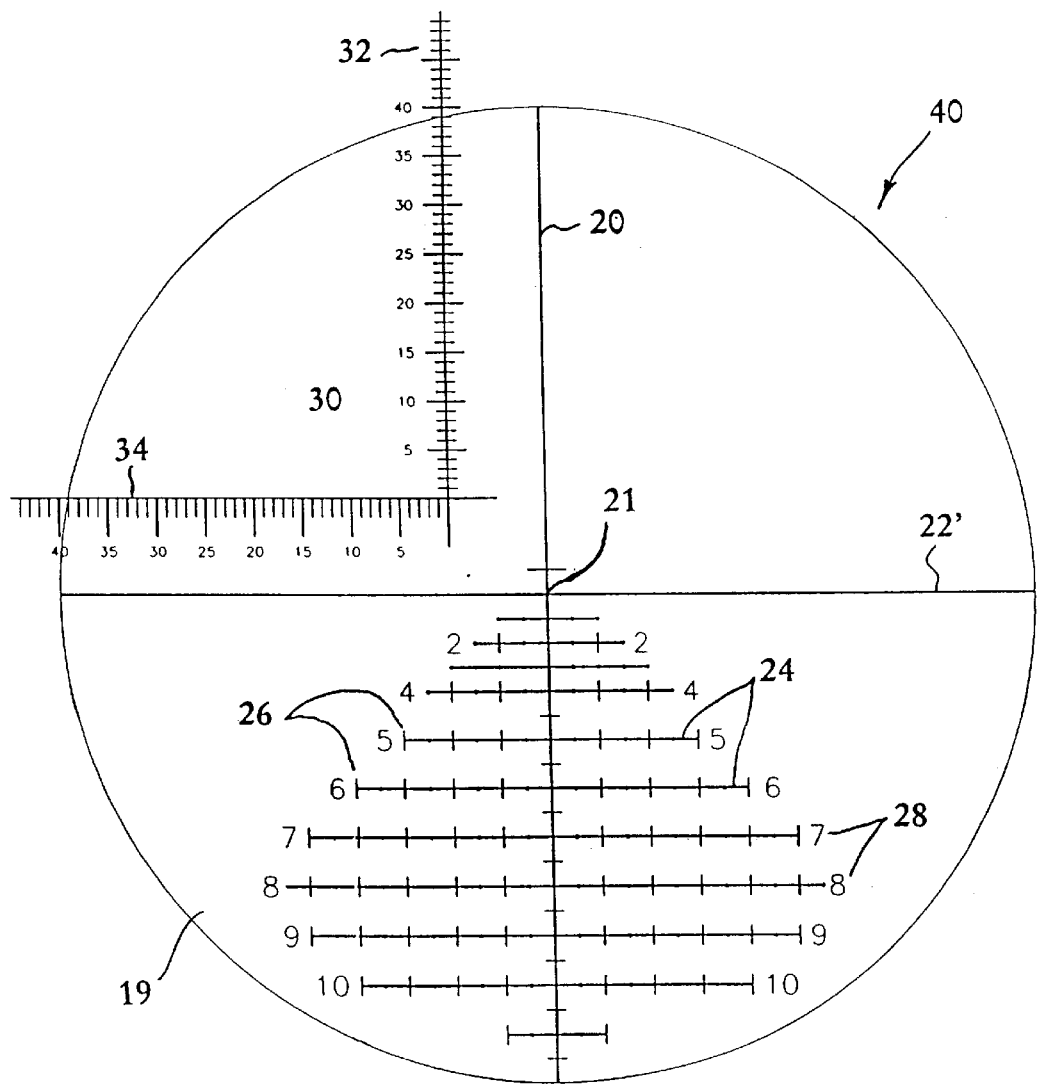
FIG. 10 is a front view of a mid-range reticle of the present invention, the spacing of the markings based upon an "inch of angle" scale.

In addition to a long-range reticle, the present invention can be adapted for use in mid-range application. For the purpose of this application, "mid-range" is defined as about 50 to about 1000 yards from the muzzle of the weapon. A mid-range reticle can be manufactured, calibrated, and used in a telescopic gunsight in the same manner as the long-range reticle described above. Although the two reticles are calibrated and used in the same fashion, slight variations can exist in their reticle markings. These slight differences stem from their different range applications. Recall that the primary horizontal cross-hair 22 in the long-range reticle was preferably located above the optical center 21 to allow for additional field of view necessary for long ranges. As shown in FIG. 10, the primary horizontal cross-hair 22' of a mid-range reticle 40 does not need to be above the optical center 21. Since the mid-range reticle is used for shorter distances, less of the lower field of view is needed. Accordingly, for a mid-range reticle, the primary horizontal cross-hair 22' is preferably be centered to intersect the primary vertical cross-hair 20 at the optical center 21. Since this provides more room in the top quadrants, the rangefinder 30 of the mid-range reticle is preferably located in the upper left quadrant rather than the lower left quadrant.

The mid-range embodiment 40 of the present invention is used in the same manner as the long-range version. The scope and reticle can be calibrated to work with almost any type of rifle. To calibrate the scope and reticle, the shooter can follow the same procedure detailed above for a long-range reticle with the reticle preferably zeroed for mid-range yardage.

Once the scope has been calibrated for the weapon and specified ammunition, the shooter can test the calculated values against actual performance at a range. It is preferred that the final range value assigned to each secondary horizontal cross-hair should be based on an actual line firing test of the selected weapon and ammunition at various ranges. At least three shots are preferably used for the final confirmation of the estimated values.

Once the reticle has been calibrated, it can be used in the field to acquire and hit targets of all sizes at mid-range distances. The rangefinder can be used to determine the range to the target as explained above with respect to the long-range reticle. Also, compensation for windage can likewise be determined as detailed above. A scope of the present invention could be used to hit targets at shorter ranges, as well as longer ranges, limited only by the capacity of the weapon and the skills of the shooter.

Figure 11:
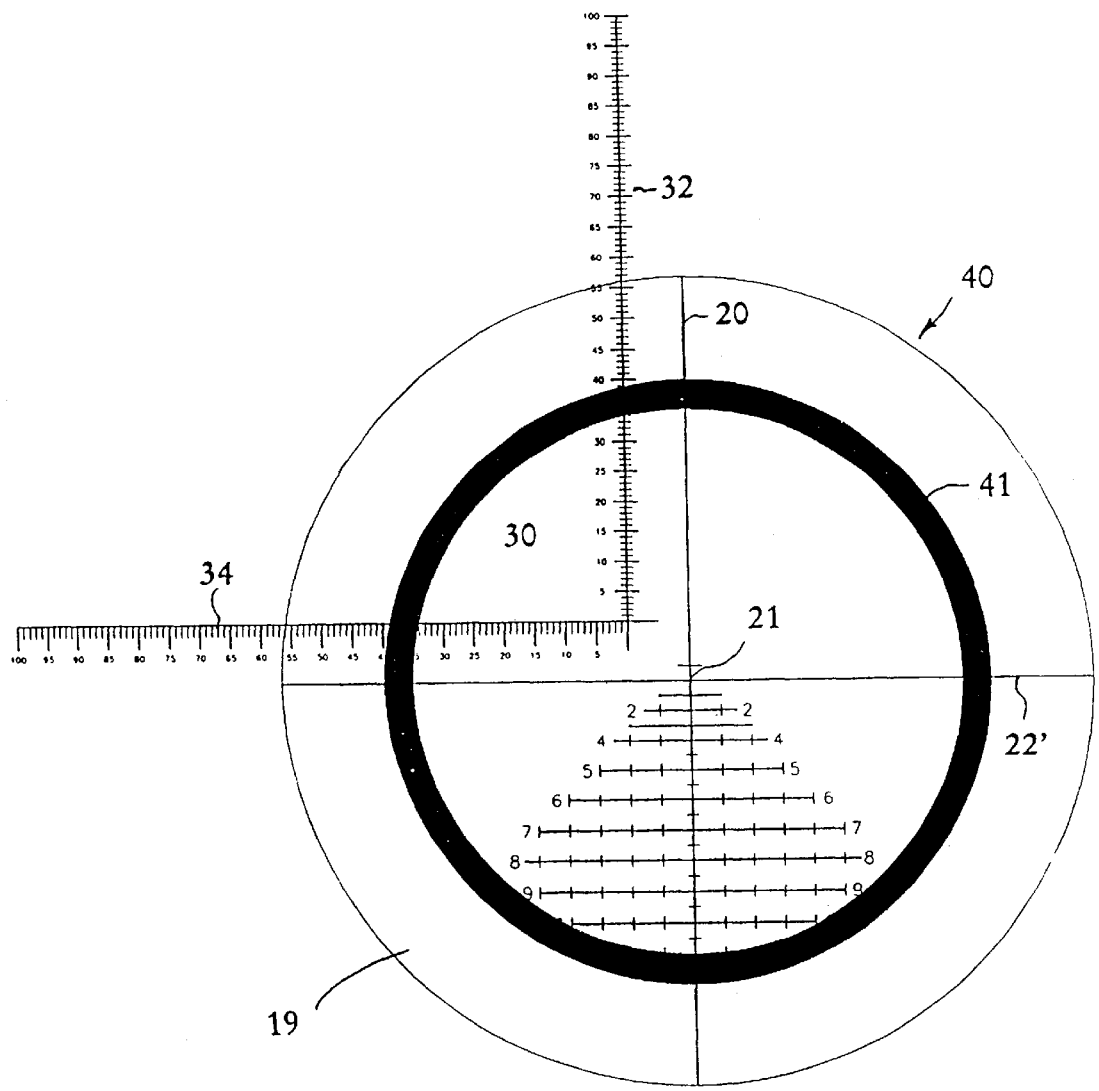
FIG. 11 is a front view of a reticle of the present invention including a circumscribing ring, the spacing of the markings based upon an "inch of angle" scale.
Figure 12:
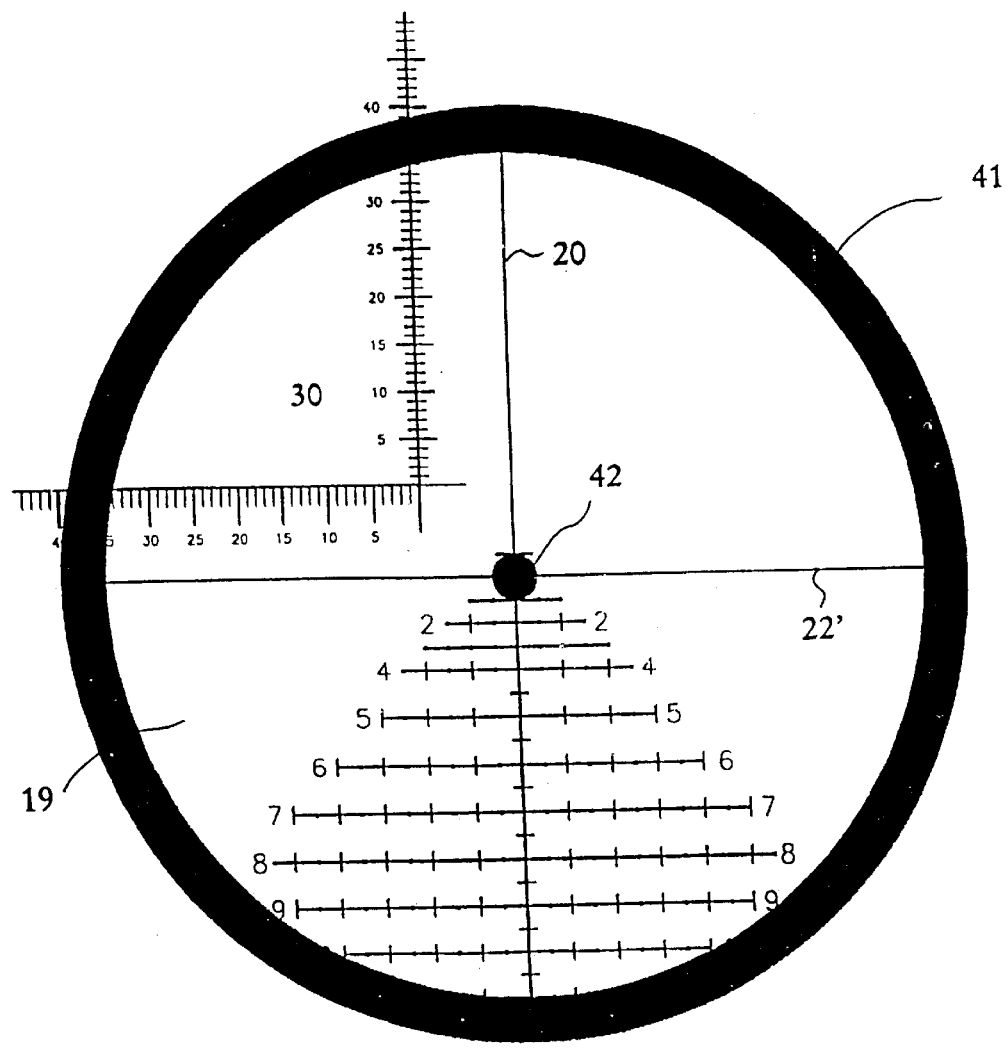
FIG. 12 is a front view of a reticle of the present invention including a circumscribing ring and an aiming dot located at the optical center, the spacing and the markings based upon an "inch of angle" scale.

More accurate results can be achieved if a shooter centers the reticle while looking through the scope. However, aligning the user's eye with the optical center of the scope is not always easy. The present invention can also be provided with a "ghost ring" 41 as depicted in FIG. 11. The ghost ring 41 is a visible ring which has as its center the optical center 21 of the scope, and which circumscribes that markings on the reticle. Ghost ring 41 aids shooters by helping them align their sight with respect to the scope and reticle. By insuring that the ghost ring 41 is centered within the field of view of the scope, the reticle will likewise be centered. As shown in FIG. 12, an aiming dot 42 can be included as an aid for rapid acquisition of moving targets, and for centering the shooter's eye in the field of view of the scope. Dot 42 is most preferably about 5 inches of angle in diameter, and is superimposed over the optical center of the reticle. Dot 42 shown is most preferably circular, but it may also be other shapes such as square, rectangular, oval, and the like. The aiming dot 42 can be a predetermined size that covers a predetermined area of the target at a given range according to a scaling of the reticle, such as inches of angle, centimeters of angle, or conventional scaling means as mentioned previously. The preferred arrangement of ghost ring 41 in combination with aiming dot 42 enhances the eye's natural tendency to center the ring 41 in the center of the field of view of the scope. By looking directly along the scope, the shooter is more likely to have accurate and repeatable shooting. The ghost ring 41 and dot 42 can be part of the reticle. Preferably ring 41 and dot 42 are etched onto one side of the disc 19. However, ring 41 and dot 42 can also be provided using other conventional methods such as, for example, printing or applying hairs or wires to disc 19, or to other optical components of the scope. Preferably aiming marking 42 is etched onto one side of the disc 19, but it can also be provided using other conventional methods such as, for example, printing or applying hairs or wires to disc 19 or to other optical components of the scope.

One skilled in the art will recognize at once that it would be possible to construct the present invention from a variety of materials and in a variety of different ways. While the preferred embodiments have been described in detail, and shown in the accompanying drawings, it will be evident that various further modification are possible without departing from the scope of the invention as set forth in the appended claims.

I claim:

1. A reticle for use in an optical device used for shooting, comprising:

a first substantially transparent disc having an optical center and an edge for mounting said disc in a housing, one or more aiming points positioned on said disc, and a ring positioned optically between said optical center and said edge, said ring spaced from said edge and circumscribing said optical center and one or more of said aiming points, whereby said ring can be visually centered in a field of view for aiding users in aligning their line of sight through the optical device, wherein one or more aiming points are formed by a primary vertical cross hair, a primary horizontal cross-hair intersecting said primary vertical cross-hair to form an upper right quadrant, an upper left quadrant, a lower left quadrant, and a lower right quadrant, a plurality of secondary horizontal cross-hairs evenly spaced a predetermined distance along said primary vertical cross-hair, a plurality of secondary vertical cross-hairs evenly space a predetermined distance along at least some of said secondary horizontal cross-hairs, unique markings identifying at least some of said secondary horizontal cross hairs, and wherein said reticle additionally includes rangefinding markings on said reticle.

2. The reticle of claim 1, wherein said ring is positioned on said transparent disc.

3. The reticle of claim 1, wherein at least some of said secondary horizontal cross-hairs each include a unique marking for identification purposes.

4. The reticle of claim 1, additionally including an aiming dot of predetermined size positioned at said optical center to further assist users in aligning their line of sight.

5. The reticle of claim 1, wherein said optical device comprises:

a housing;

an objective lens mounted in said housing at one end thereof;

an ocular lens mounted in said housing at an opposite end thereof for creating with said objective lens a field of view;

said reticle mounted in said housing between said objective lens and said ocular lens, whereby said ring can be visually centered in a field of view for aiding users in aligning their line of sight through the telescopic gunsight.

6. The reticle of claim 5, wherein said optical device additionally includes variable power optics for permitting a user to select the optical power of the optical device within a predetermined range, and wherein said reticle is mounted between said variable power optics and said objective lens.

7. The reticle of claim 5, wherein said optical device is a gunshight and said housing is mounted in a fixed, predetermined position relative to a gun barrel.

8. The reticle of claim 1, wherein said ring is positioned on said disc.

9. The reticle of claim 1, wherein said reticle additionally includes some rangefinder markings.

10. A reticle for use in an optical device used for shooting, comprising:

a first substantially transparent disc having an optical center and an edge for mounting said disc in a housing, one or more aiming points positioned on said disc, and a ring positioned optically between said optical center and said edge, said ring spaced from said edge and circumscribing said optical center and one or more of said aiming points, whereby said ring can be visually centered in a field of view for aiding users in aligning their line of sight through the optical device, wherein said optical device comprises:

a housing;

an objective lens mounted in said housing at one end thereof;

an ocular lens mounted in said housing at an opposite end thereof for creating with said objective lens a field of view;

said reticle mounted in said housing between said objective lens and said ocular lens, whereby said ring can be visually centered in a field of view for aiding users in aligning their line of sight through the telescopic gunsight, wherein said ring is positioned between said reticle and said variable power optics.

* * * * *

UNITED STATES PATENT AND TRADEMARK OFFICE
CERTIFICATE OF CORRECTION

PATENT NO. : 6,681,512 B2
APPLICATION NO. : 10/092921
DATED : January 27, 2004
INVENTOR(S) : Sammut It is certified that error appears in the above-identified patent and that said Letters Patent is hereby corrected as shown below:

In the Claims:

Claim 1 at column 13, line 2 of the patent reads:
1. A reticle for use in an optical device used for shooting, comprising: a first substantially transparent disc having an optical center and an edge for mounting said disc in a housing, one or more aiming points positioned on said disc, and a ring positioned optically between said optical center and said edge, said ring spaced from said edge and circumscribing said optical center and one or more of said aiming points, whereby said ring can be visually centered in a field of view for aiding users in aligning their line of sight through the optical device, wherein one or more aiming points are formed by a primary vertical cross hair, a primary horizontal cross-hair intersecting said primary vertical cross-hair to form an upper right quadrant, an upper left quadrant, a lower left quadrant, and a lower right quadrant, a plurality of secondary horizontal cross-hairs evenly spaced a predetermined distance along said primary vertical cross-hair, a plurality of secondary vertical cross-hairs evenly space a predetermined distance along at least some of said secondary horizontal cross-hairs, unique markings identifying at least some of said secondary horizontal cross hairs, and wherein said reticle additionally includes rangefinding markings on said reticle. [[incorrect]]

when in fact it should read:

1. A reticle for use in an optical device used for shooting, comprising: a first substantially transparent disc having an optical center and an edge for mounting said disc in a housing, one or more aiming points positioned on said disc, and a ring positioned optically between said optical center and said edge, said ring spaced from said edge and circumscribing said optical center and one or more of said aiming points, whereby said ring can be visually centered in a field of view for aiding users in aligning their line of sight through the optical device, wherein one or more aiming points are formed by a primary vertical cross hair, a primary horizontal cross-hair intersecting said primary vertical cross-hair to form an upper right quadrant, an upper left quadrant, a lower left quadrant, and a lower right quadrant, a plurality of secondary horizontal cross-hairs evenly spaced a predetermined distance along said primary vertical cross-hair, a plurality of secondary vertical cross-hairs evenly Signed and Sealed this
Fourth Day of June, 2013

Teresa Stanek Rea
*Acting Director of the United States Patent and Trademark Office* spaced a predetermined distance along at least some of said secondary horizontal cross-hairs, unique markings identifying at least some of said secondary horizontal cross hairs, and wherein said reticle additionally includes rangefinding markings on said reticle. [[correct]]